(12) United States Patent
Kawahara

(10) Patent No.: US 7,095,001 B2
(45) Date of Patent: Aug. 22, 2006

(54) IMAGE SENSING APPARATUS AND METHOD PERFORMING BLUR CORRECTION USING ELECTRICAL COORDINATE CONVERSION

(75) Inventor: Hideo Kawahara, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 112 days.

(21) Appl. No.: 10/925,998

(22) Filed: Aug. 26, 2004

(65) Prior Publication Data

US 2005/0061952 A1    Mar. 24, 2005

(30) Foreign Application Priority Data

Aug. 29, 2003   (JP)   ............................. 2003-307185

(51) Int. Cl.
   *G02B 27/64*   (2006.01)
   *G02B 27/40*   (2006.01)
   *G02B 7/04*    (2006.01)

(52) U.S. Cl. ................... 250/201.2; 250/206; 382/275; 396/52; 396/102

(58) Field of Classification Search ............. 250/201.1, 250/201.2, 201.4, 206, 216; 348/208.4–208.7, 348/208.11; 382/255, 275; 396/52–55, 396/89–152
See application file for complete search history.

(56) References Cited

U.S. PATENT DOCUMENTS

| 5,121,317 A | 6/1992 | Vogler |
| 5,867,213 A * | 2/1999 | Ouchi ...................... 348/208.5 |
| 6,734,901 B1 | 5/2004 | Kudo et al. |
| 6,882,754 B1 * | 4/2005 | Hayashi ..................... 382/275 |

FOREIGN PATENT DOCUMENTS

| JP | 03-110797 | 5/1991 |
| JP | 09-181959 | 7/1997 |

* cited by examiner

*Primary Examiner*—Stephone B. Allen
*Assistant Examiner*—Patrick J. Lee
(74) *Attorney, Agent, or Firm*—Fitzpatrick, Cella, Harper & Scinto

(57) ABSTRACT

An image sensing apparatus performs a plurality of times of image sensing on a subject, superpose-combines the obtained plurality of subject images into one subject image. The apparatus has an image sensing unit that converts a subject optical image into an electric signal, an optical unit that changes a view angle, and a change unit that changes the position of the optical unit by a predetermined amount so as to widen the view angle by a predetermined amount, prior to the plurality of times of image sensing.

24 Claims, 13 Drawing Sheets

IMAGE SENSING APPARATUS AND METHOD PERFORMING BLUR CORRECTION USING ELECTRICAL COORDINATE CONVERSION

FIELD OF THE INVENTION

The present invention relates to an image sensing apparatus and method for obtaining plural images by image sensing and superpose-combining the plural images to one image.

BACKGROUND OF THE INVENTION

Conventionally, in image sensing apparatuses including a video camera, automation and multiple functions have been developed as automatic exposure (AE), automatic focus (AF) and the like, thus excellent image sensing can be easily performed.

Further, in recent years, with downsizing of image sensing apparatuses and development of high-powered optical system, shake of an image sensing apparatus (camera shake) or the like becomes a major factor of degradation of image quality. Accordingly, various blur correction functions to correct blur of an image caused by apparatus, shake or the like have been proposed. In a case where such blur correction function is incorporated in an image sensing apparatus, improved image sensing can be performed.

As an example of blur correction function, optical blur correction has been proposed. First, shake of an image sensing apparatus is detected as an angular velocity by an angular velocity sensor such as a gyroscope attached to an image sensing unit, then a direct current (DC) component of an angular velocity signal obtained by the angular velocity sensor is cut by a direct current cut filter which passes only an alternating current component, i.e. vibration component, and the angular velocity signal which passed the filter is amplified by an amplifier to an appropriate level. Thereafter, the angular velocity signal is subjected to integration processing by an integrator thereby converted to an angular displacement signal, and an optical shake correction unit is driven so as to suppress blur, based on the angular displacement signal obtained from the integrator (for example, Japanese Patent Application Laid-Open No. 9-181959).

The optical blur correction unit is an optical correction mechanism to displace an optical axis to cancel out the camera shake. For example, a method of displacing an optical axis of light incident on an image sensing surface by displacing a blur correction lens on a plane orthogonal to the optical axis has been proposed.

In this manner, by optically canceling out the shake of the image sensing unit, optical blur correction is always performed during image sensing (during exposure), thus an image without blur can be obtained.

On the other hand, a blur correction system which performs blur correction by electrical process has been proposed. As an example, known is a method of performing image sensing with short-time exposure, short enough not to be affected by camera shake, a plurality of times in a short period, then combining (superposing) a plurality of images obtained by the image sensing while correcting shifts of the images, thus obtaining an image (combined image) with appropriate exposure time (for example, Japanese Patent No. 3110797).

Recent image sensing apparatuses such as digital cameras and video cameras are being downsized such that they can be incorporated in hand-held electronic devices (for example, a cellular phone). In this situation, if the above-described optical blur correction system is to be incorporated in a camera, the blur correction optical device must be further downsized or the vibration detection unit must be further downsized.

However, in the optical blur correction system, as it is necessary to support the correction lens and drive it with high accuracy, downsizing is limited. Further, as most of currently-used vibration detection units utilize an inertial force, if such vibration detection unit is downsized, the detection sensitivity is degraded and shake correction cannot be performed with high accuracy.

Further, as shake applied to an image sensing apparatus, angular shake about a predetermined axis and shift shake to horizontally shake the image sensing apparatus are known. The angular shake can be corrected by the optical shake prevention system, while the shift shake cannot be prevented without difficulty. Particularly, the shift shake is increased as the camera is downsized.

On the other hand, the above-described blur correction system using electrical coordinate conversion simply has a construction to perform image sensing a plurality of times within a predetermined period. More particularly, as long as a shutter having a higher speed than that of conventional shutters is continuously driven plural times, the mechanism can be easily downsized in comparison with the optical blur correction system. Further, regarding the above-described shift shake, as a plurality of images obtained by image sensing are combined (superposed) into an image (combined image) with appropriate exposure time while shift of images is corrected, shift shake can be corrected. Accordingly, regarding downsizing of an image sensing apparatus, the blur correction system using electrical coordinate conversion is advantageous by virtue of its characteristic.

Next, a conventional image sensing apparatus capable of blur correction using the above-described electrical coordinate conversion will be described.

FIG. 10 is a block diagram showing the construction of a conventional image sensing apparatus which performs blur correction using electrical coordinate conversion.

In FIG. 10, reference numeral 150 denotes a zoom lens; 210, a zoom driving motor; and 220, a zoom controller. When a user operates a zoom operation unit 202 so as to change a view angle, an operation signal is inputted into an image sensing controller 200. The image sensing controller 200 generates a zoom control signal based on the operation signal and sends the signal to the zoom controller 220. The zoom controller 220 converts the zoom control signal into an electrical driving signal to drive the zoom driving motor 210, and drives the zoom driving motor 210 to move the zoom lens 150. Then the zoom lens 150 is stopped in a desired position, thereby the image sensing view angle is changed.

Further, numeral 151 denotes an aperture; 211, an aperture driving motor; 221, an aperture controller; 152, a focus lens; 212, a focus driving motor to directly drive the focus lens 152; and 222, a focus controller. Control operations of the aperture 151 and the focus lens 152 will be described later.

Further, numeral 153 denotes a shutter; 213, a shutter driving actuator; and 223, a shutter controller. The shutter 153 is provided to limit light flux incident on an image sensing device 161 when reading of image signal from the image sensing device 161 is performed after exposure of the image sensing device 161 in correspondence with the user's operation of a release operation unit 201 to be described later. The shutter 153 has a plurality of shutter blades. The shutter blades receive a driving force from the shutter driving actuator 213, to open/close an opening as a light passing port, thereby the light flux incident on the image sensing device 161 is controlled. Further, the release operation unit 201 has a two-stage switch structure where a switch SW1 is turned ON upon half stroke of the release operation unit, and a switch SW2 is turned ON upon full stroke of the release operation unit via the half stroke.

The image sensing device 161 generates electric charge corresponding to the amount of incident light and outputs an image signal corresponding to the charge. The image sensing device 161 comprises, e.g., a semiconductor image sensing device such as a MOS or CCD, however, is not limited to such device.

The light flux (image sensing light) incident via the zoom lens 150 is light-amount limited with the aperture 151, passed through the focus lens 152 and the shutter 153, forms an image on the image sensing device 161, and converted to electric charge and accumulated. The electric charge accumulated in the image sensing device 161 (image signal) is read at predetermined timing, then converted to a digital signal by e.g. an A/D converter (not shown), and inputted into a camera signal processor 162. The camera signal processor 162 performs predetermined signal processing on the input digital image signal to e.g. form luminance signal and color signals, thus forms a color image signal.

The image sensing controller 200, comprising e.g. a microcomputer, performs automatic focus (AF) control, automatic exposure (AE) control, zoom lens control, shutter control and the like, and inputs operation signals from the release operation unit 201, the zoom operation unit 202 and a blur correction operation unit 203. When operation signals have been inputted from the release operation unit 201 and the zoom operation unit 202, the image sensing controller 200 sends control signals based on the input operation signals to the shutter controller 223 and the zoom controller 220 in accordance with an image sensing status of the camera, to set image sensing conditions, such that image sensing is performed.

Further, the image sensing controller 200 obtains an average level of luminance signal obtained from the camera signal processor 162, i.e., subject luminance or the like. The image sensing controller 200 performs predetermined arithmetic processing using the obtained subject luminance, generates an aperture control signal, and sends the signal to the aperture controller 221. The aperture controller 221 converts the aperture control signal into an electrical driving signal to drive the aperture driving motor 211, and opens/closes the plural blades of the aperture 151 by driving the aperture driving motor 211, thereby changes the opening area (aperture diameter) as a light passing port. In this manner, the opening diameter of the aperture 151 is changed until the average level of luminance signal finally becomes equal to a predetermined reference value and stopped, thereby AE control is realized.

On the other hand, the image sensing controller 200 performs predetermined arithmetic processing based on a frequency component or the like included in the luminance signal obtained from the camera signal processor 162, and generates a focus control signal. The focus control signal is sent to the focus controller 222, and converted to an electrical driving signal to drive the focus driving motor 212. The focus driving motor 212 moves the focus lens 152 in an optical axis direction in correspondence with the driving signal. In this manner, focusing operation is performed by moving the focus lens 152 to a position where the predetermined frequency component included in the luminance signal finally has a maximum value (focused position), and stopping the lens 152, thereby AF control is realized.

Numeral 165 denotes a signal switching unit which is switched in correspondence with an operation of the blur correction operation unit 203. When the blur correction operation unit 203 is turned ON, the signal switching unit 165 is connected to the side of an image memory 171, while when the blur correction operation unit 203 is turned OFF, the signal switching unit 165 is connected to the side of an image processor 175. Numeral 172 denotes a shift detector; 173, a coordinate converter; and 174, an image combiner. These circuits are used in blur correction. Numeral 176 denotes a recorder; and 180, a monitor.

Next, the operation of the image sensing apparatus having the above construction will be described with reference to a flowchart of FIG. 11.

At step S101, the operation is started. For example, the operation is repeatedly started at predetermined timing such as a vertical synchronizing period of a moving image.

When the operation starts, it is determined at step S102 whether or not the switch SW1 is turned ON by the user's half stroke of the release operation unit 201. If it is determined that the switch SW1 is turned ON, the process proceeds to step S103, while if the half stroke operation is not performed, the current process ends.

At step S103, as described above, the image sensing controller 200 outputs an aperture control signal based on an image signal obtained from the camera signal processor 162, to control the aperture 151 to have an appropriate opening area via the aperture controller 221 and the aperture driving motor 211, thereby AE control is performed.

When the AE control has been completed, the process proceeds to step S104, at which, as described above, the image sensing controller 200 outputs a focus control signal based on the image signal obtained from the camera signal processor 162, to move the focus lens 152 to a focusing position via the focus controller 222 and the focus driving motor 212, thereby AF control is performed.

Next, at step S105, it is determined whether or not the user has turned the blur correction operation unit 203 ON. If it is determined that the blur correction operation unit 203 is ON, the process proceeds to step S106, at which a blur correction operation is started, while if it is determined that the blur correction operation unit 203 is OFF, proceeds to step S108.

As an example where the blur correction operation unit 203 is ON, the subject of image sensing is dark and sufficient exposure cannot be performed within a short period. The timing of closing the shutter 153 (exposure time) and the aperture diameter of the aperture 151 are set based on a photometry value obtained by the AE operation at step S103. Generally, in an image sensing condition where a blur correction system is used, as the subject is dark, the aperture is fully opened and the exposure time is long. In this case, as the influence of camera shake of the image sensing apparatus, i.e., the shake of image on an image sensing surface cannot be negligible, the blur correction operation unit 203 is turned ON and the following operation is performed.

First, at step S106, the number of images to be taken and respective exposure time are determined from the image sensing conditions such as brightness of the subject obtained at step S103. Note that the image sensing conditions are:
Brightness of the subject
Focal length of image sensing optical system
Brightness of image sensing optical system (aperture value)
Sensitivity of image sensing device For example, assume that the sensitivity of the image sensing device 161 is ISO 200, the brightness of the subject is measured (photometry) and based on the result of the photometry, the aperture 151 is set to f2.8 for appropriate exposure, and the opening timing of the shutter 153, i.e., the exposure time is set to ⅛ sec. If the focal length of the image sensing optical system is 30 mm for a 35 mm film, there is a possibility of image blur due to camera shake in image sensing with the exposure time of ⅛ sec. To prevent the effect of camera shake, the exposure time is set to 1/32 sec and the number of times to perform image sensing operation is set to 4, thereby a total exposure time of ⅛ sec can be obtained.

As another example, if the focal length is 300 mm, the exposure time is set to 1/320 sec and the number of times to perform image sensing operation is set to 40 (1/320 sec×40 times=⅛ sec).

In this case, as each image obtained by short exposure time becomes an underexposure image, however, the influence of camera shake is reduced.

In this manner, when the image sensing operation is repeated a plurality of number of times, the exposure time in each image sensing operation is set in correspondence with the image sensing conditions, and further, the number of images to be taken (how many times image sensing operation is to be performed) is set in correspondence with the image sensing conditions.

At step S107, when the switch SW2 becomes ON by the user's full stroke of the release operation unit 201, the process proceeds to step S112, while if the full stroke of the release operation unit 201 is not performed, the process ends.

At step S112, the shutter 153 is released to achieve the exposure time obtained at step S106, and electric charge is read from the image sensing device 161. The read electric charge is A/D converted to a digital signal, then is subjected to predetermined signal processing by the camera signal processor 162. The signal-processed image is recorded via the signal switching unit 165 into the image memory 171. At step S113, it is determined whether or not the number of images obtained by image sensing is equal to the number of images set at step S106. If the necessary number of images have been obtained, the process proceeds to step S114, while if the necessary number of images have not been obtained, the process returned to step S112 to repeat the processing from the image sensing to the recording in the image memory 171.

Even though the influence of camera shake is not caused in each of the images obtained by the plurality of image sensing operation, the composition among the images may be slightly shifted due to camera shake during the consecutive image sensing operation. Accordingly, if these images are simply combined without any processing, the combined image becomes a blurred image due to the shift of composition among the images. Therefore, the shift among the images must be corrected.

For this purpose, at step S114, successive two images are read out of the images stored in the image memory 171, and the shift detector 172 extracts a characteristic feature image portion (feature point), and obtains the coordinates of the feature point in the image. More specifically, an image and its subsequent image are compared with each other, then a feature point is extracted and its coordinates are obtained.

Next, at step S115, the coordinates of each image stored in the image memory 171 are converted by the coordinate converter 173. More specifically, each image is shifted by a difference in coordinate values such that the feature point obtained at step S114 has the same coordinate values in the respective images.

The feature point extraction, the coordinate position calculation, and the coordinate conversion will be described in detail later.

At step S116, it is determined whether or not the coordinate conversion has been completed for all the images stored in the image memory 171. The processing at steps S114 and S115 is repeated until all the images have been processed, and when all the images have been processed, the process proceeds to step S117.

At step S117, all the images, of which the coordinates of the feature point have become the same by coordinate conversion at step S115, are combined by the image combiner 174. The image combining may be performed by, e.g., adding image sensing signals of corresponding coordinates in the respective images. In this manner, as the plurality of images are combined to one image, underexposure state of each image can be improved.

The combined image is considered to have an area, where all the images are not superposed due to composition shift, in a peripheral portion of the combined image. Accordingly, at step S117, at the same time of the image combining, the area where all the images are not superposed is cut and a rectangular image is obtained. This is because as a result of combining processing, in such area where all the images are not superposed, the amount of added image signals is insufficient and is dark. The above cutting processing will be described later.

Next, at step S118, the image processor 175 performs predetermined image processing such as gamma correction and compression on the image signal of the obtained combined image.

At step S119, the processed combined image data is recorded in the recorder 176 such as a hard disk recorder or a semiconductor memory. Further, at step S120, the image data recorded at step S119 is displayed on the monitor 180 such as a liquid crystal monitor.

Note that the method of combining images obtained by image sensing while correcting shifts of the images to obtain an image (combined image) with an expanded dynamic range has been conventionally disclosed (for example, Japanese Patent NO. 3110797).

Next, the processing in a case where it is determined at step S105 that the blur correction operation unit 203 is OFF will be described.

At step S108, the exposure time to be used in image sensing operation is determined from the image sensing conditions such as the brightness of the subject or the like obtained at step S103. The way of obtaining the exposure time is similar to that performed at step S106, however, as the blur correction processing is not performed here, the exposure time is obtained on the premise that image sensing is performed once.

At step S109, when the switch SW2 is turned ON by the user's full stroke of the release operation unit 201, the process proceeds to step S111, while if the full stroke of the release operation unit 201 has not been performed, the process ends.

At step S111, the shutter 153 is released to achieve the exposure time determined at step S108, and an image is obtained. The image is subjected to predetermined signal processing by the camera signal processor 162, then inputted via the signal switching unit 165 into the image processor 175, and the above-described processing such as gamma correction and compression are performed at step S118. As the subsequent operations are the same as those described above, the explanations thereof will be omitted. Note that the image obtained at step S111 may be temporarily stored in an internal memory (not shown) then sent to the image processor 175. Further, the image memory 171 may be employed as this internal memory.

Next, the feature point extraction, the coordinate calculation and the coordinate conversion performed by the shift detector 172 at step S114 will be described.

As shown in FIG. 12, for example, a picture where a person 411a stands against the background of a building 412a and a tree 413a in a frame 401a is considered. When the same subject is sensed a plurality of times, a frame 401b with a composition shifted from that of the frame 401a may be obtained due to camera shake. Note that the frame with shifted composition is denoted by 401b for convenience of explanation, however, an actually image-sensed area is the frame 401a.

The shift detector 172 extracts an edge of a window 421a, which is a high brightness point in the building 412a in the image, as a feature point 422a, by edge detection, then compares the feature point 422a with a feature point 422b in the image frame 401b, and corrects the difference therebetween (coordinate conversion).

In FIG. 12, as indicated with an arrow 423, the frame 401b is coordinate-converted such that the feature point 422b in the frame 401b is superposed on the feature point 422a in the frame 401a.

In this example, the number of feature points is one for convenience of explanation, however, actually, plural feature points exist within one image. It may be arranged such that based on these information, the amount of coordinate movement is calculated by averaging shift amounts of the feature points and the coordinate conversion is performed.

Further, in the above description, the coordinate conversion is performed between two frames, however, the images are obtained in correspondence with the number of images to be taken determined at step S106. Accordingly, regarding more than two frames, shift correction of all the images can be performed by repeating the coordinate conversion as described above.

The feature point extraction, the coordinate position calculation and the coordinate conversion are performed as described above.

Finally, the cutting processing of an area where all the images are not superposed due to composition shift, performed at step S117, will be described.

FIGS. 13A to 13C show a case where two images with a composition shift as shown in FIG. 12 are combined.

If coordinate conversion is performed on the two images 402a and 402b as shown in FIGS. 13A and 13B and image combining is performed, an image 403 as shown in FIG. 13C is generated. However, the image 403 has an area 404 where the images are not superposed.

As described above, in an image portion where all the images are not superposed, as the level of added image signals is insufficient and the combined image is dark, only an area where all the images are superposed is handled as a combined image, and the area 404 is removed from the image.

However, in the above-described blur correction system using electrical coordinate conversion, the view angle of the combined image becomes smaller than that of images upon image sensing because of the combining method, and the user's intended view angle cannot be obtained.

This problem occurs since an area where the images are not superposed is cut after the coordinate conversion by the image processor 175.

SUMMARY OF THE INVENTION

The present invention has been made in consideration of the above situation, and has its object to, in a case where a plurality of images are superpose-combined to one image as in blur correction using electrical coordinate conversion, obtain a view angle equal to or close to that intended by a camera user.

According to the present invention, the foregoing object is attained by providing an image sensing apparatus which performs a plurality of times of image sensing on a subject, superpose-combines a plurality of subject images obtained by the image sensing into one subject image, comprising:

an image sensing unit that converts a subject optical image into an electric signal;

an optical unit that changes a view angle; and a change unit that changes a position of the optical unit so as to widen the view angle by a predetermined amount, prior to the plurality of times of image sensing on the subject.

According to the present invention, the foregoing object is also attained by providing an image sensing method comprising:

widening a view angle by a predetermined amount;

performing a plurality of times of image sensing on a subject by an image sensing unit that converts a subject optical image into an electric signal; and superpose-combining obtained plurality of subject images into one subject image.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

First, a first embodiment of the present invention will be described.

Figure 1:
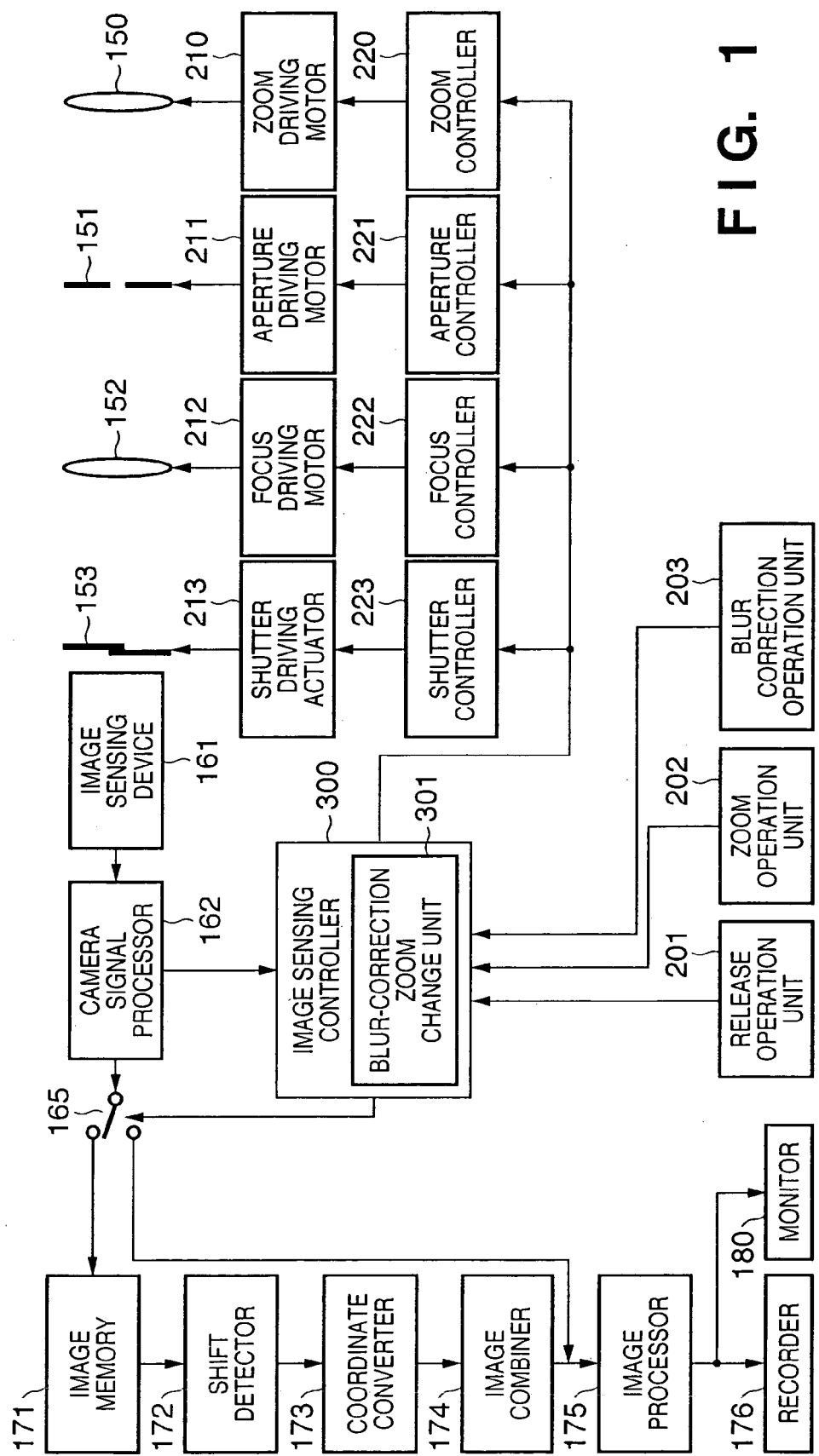
FIG. 1 is a block diagram schematically showing the construction of an image sensing apparatus according to a first embodiment of the present invention.
Figure 10:
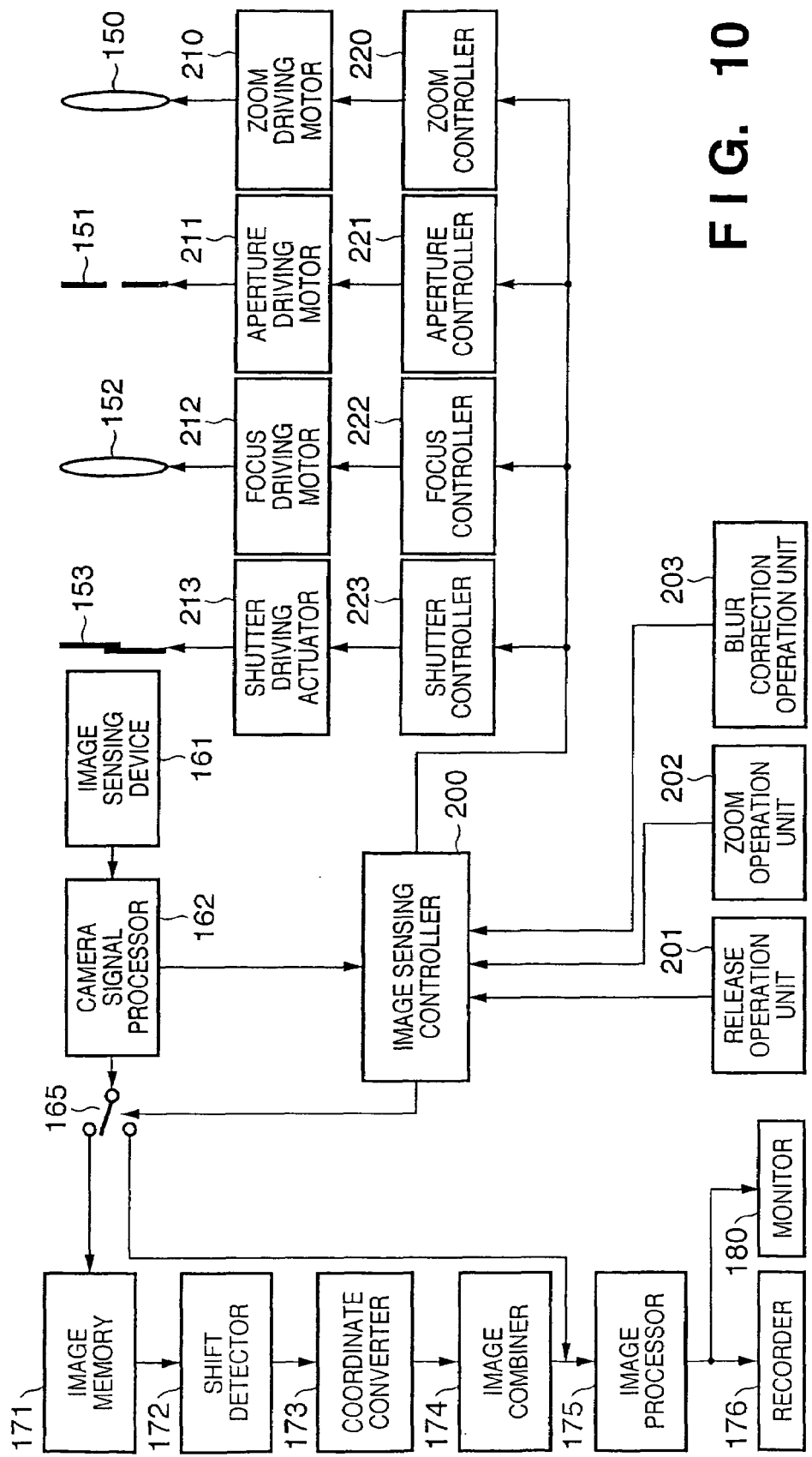
FIG. 10 is a block diagram showing the construction of the conventional image sensing apparatus.
Figure 11:
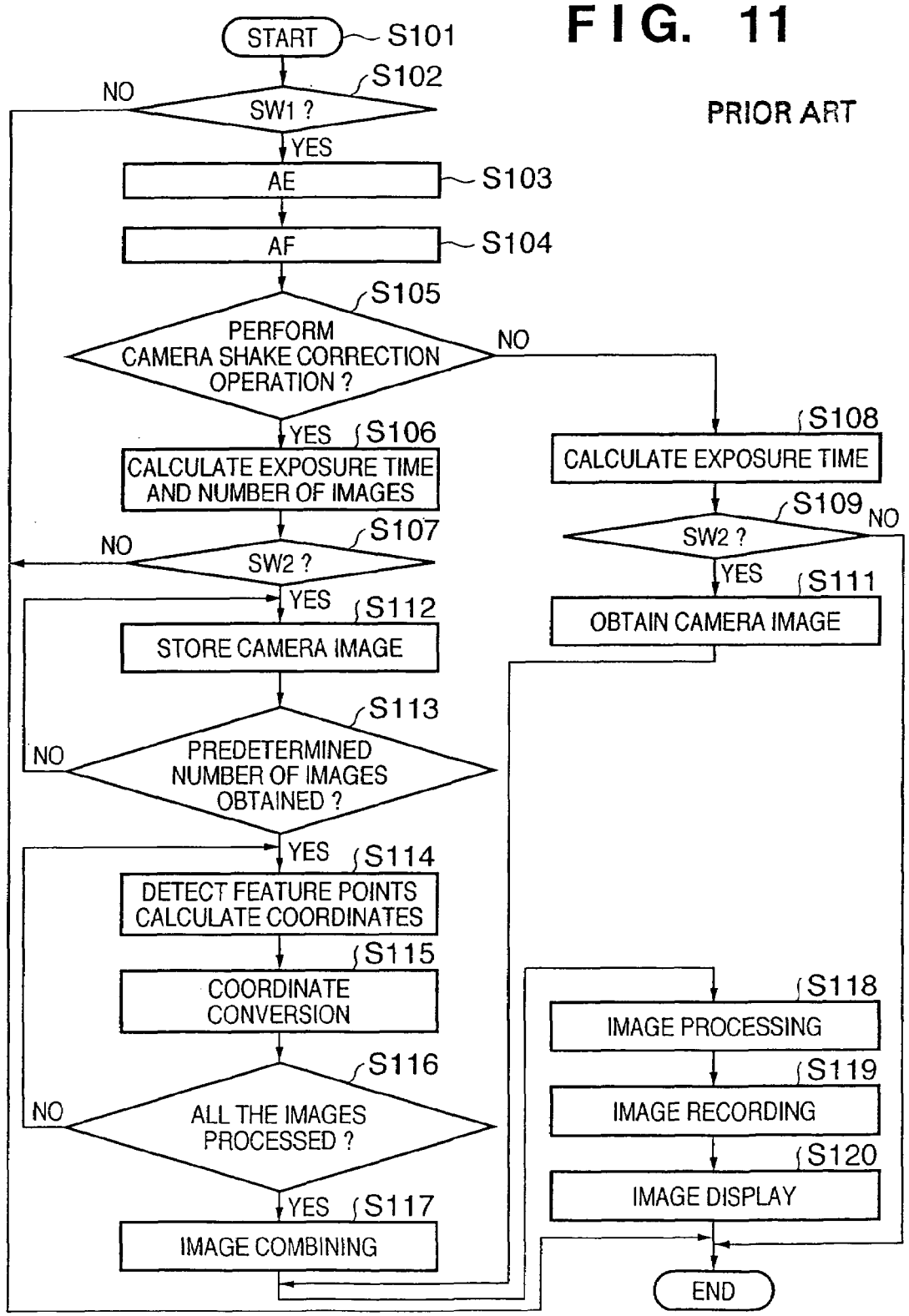
FIG. 11 is a flowchart showing the operation of the conventional image sensing apparatus.

FIG. 1 is a block diagram schematically showing the construction of an image sensing apparatus according to the first embodiment of the present invention. The difference from the conventional image sensing apparatus shown in FIG. 10 is that an image sensing controller 300 has a blur-correction zoom change unit 301. The other constituent elements corresponding to those in FIG. 10 have the same reference numerals, and the explanations thereof will be omitted.

The blur-correction zoom change unit 301 controls a zoom lens position in correspondence with the ON/OFF state of blur correction processing by the blur correction operation unit 203. The operation of the blur-correction zoom change unit 301 will be described in detail in the following description with reference to the flowchart.

Next, the operation of the image sensing apparatus according to the first embodiment will be described with reference to the flowchart of FIG. 2.

At step S201, the operation is started. For example, the operation is repeatedly started at predetermined timing such as a vertical synchronizing period of a moving image.

When the operation starts, it is determined at step S202 whether or not the switch SW1 is turned ON by the user's half stroke of the release operation unit 201. If it is determined that the switch SW1 is turned ON, the process proceeds to step S203, while if the half stroke operation is not performed, the current process ends.

At step S203, as described above, the image sensing controller 200 outputs an aperture control signal based on an image signal obtained from the camera signal processor 162, to control the aperture 151 to have an appropriate opening area via the aperture controller 221 and the aperture driving motor 211, thereby AE control is performed. Note that the AE control may be realized by other well-known method of, e.g., providing a photometry unit, as well as the method described in the conventional art. However, as this control is not directly related to the present invention, the explanation of details of the control will be omitted.

When the AE control has been completed, the process proceeds to step S204, at which, as described above, the image sensing controller 200 outputs a focus control signal based on the image signal obtained from the camera signal processor 162, to move the focus lens 152 to a focusing position via the focus controller 222 and the focus driving motor 212, thereby AF control is performed. Note that the AF control may be realized by various well-known methods, however, as this control is not directly related to the present invention, the explanation of details of the control will be omitted.

Next, at step S205, it is determined whether or not the user has turned the blur correction operation unit 203 ON. If it is determined that the blur correction operation unit 203 is ON, the process proceeds to step S251, at which a blur correction operation is started, while if it is determined that the blur correction operation unit 203 is OFF, proceeds to step S208.

First, the flow of processing in a case where the blur correction operation unit 203 is ON will be described.

When the blur correction operation has been started, the zoom lens 150 is moved by a predetermined amount in a direction of shorter focal length than that of the currently set focal length, i.e., in a direction to widen the view angle, at step S251. More particularly, the blur-correction zoom change unit 301 of the image sensing controller 300 generates a zoom control signal to move the zoom lens 150 by a predetermined amount from the currently set position, and sends the signal to the zoom controller 220. The zoom controller 220 moves the zoom lens 150 by the predetermined amount via the zoom driving motor 210 based on the zoom control signal, thereby a wider view angle is obtained.

Next, at step S206, the number of images to be sensed and respective exposure time are obtained from the image sensing conditions such as brightness of the subject obtained at step S203. Note that the image sensing conditions here are:
Brightness of the subject
Focal length of image sensing optical system
Brightness of image sensing optical system (aperture value)
Sensitivity of image sensing device For example, assume that the sensitivity of the image sensing device 161 is ISO 200, the brightness of the subject is measured (photometry) and based on the result of the photometry, the aperture 151 is set to f2.8 for appropriate exposure, and the opening timing of the shutter 153, i.e., the exposure time is set to 1/8 sec. If the focal length of the image sensing optical system is 30 mm for a 35 mm film, there is a possibility of image blur due to camera shake in image sensing with the exposure time of 1/8 sec. To prevent the effect of camera shake, the exposure time is set to 1/32 sec and the number of time to perform image sensing operation is set to 4, thereby a total exposure time of 1/8 sec can be obtained.

As another example, if the focal length is 300 mm, the exposure time is set to 1/320 sec and the number of times to perform image sensing operation is set to 40 (1/320 sec×40 times=1/8 sec).

In this manner, when the image sensing operation is repeated a plurality of number of times, the exposure time in each image sensing operation is set in correspondence with the image sensing conditions, and further, the number of images to be taken (how many times image sensing is to be performed) is set in correspondence with the image sensing conditions.

At step S207, when the switch SW2 becomes ON by the user's full stroke of the release operation unit 201, the process proceeds to step S212, while if the full stroke of the release operation unit 201 is not performed, proceeds to step S253.

At step S212, the shutter 153 is released to achieve the exposure time obtained at step S206, and electric charge is read from the image sensing device 161. The read electric charge is A/D converted to a digital signal, then is subjected to predetermined signal processing by the camera signal processor 162. The signal-processed image is recorded via the signal switching unit 165 into the image memory 171. At step S213, it is determined whether or not the number of images obtained by image sensing is equal to the number of images set at step S206. If the necessary number of images have been obtained, the process proceeds to step S214, while if the necessary number of images have not been obtained, the process returned to step S212 to repeat the processing from the image sensing to the recording in the image memory 171.

At step S214, successive two images are read out of the images stored in the image memory 171, and the shift detector 172 extracts a characteristic feature image portion (feature point), and obtains the coordinates of the feature point in the image. As described above, a previous image and its subsequent image are compared with each other, then a feature point is extracted and its coordinates are obtained.

Next, at step S215, the coordinates of each image stored in the image memory 171 are converted by the coordinate converter 173. More specifically, each image is shifted by a difference in coordinate values such that the feature point obtained at step S214 has the same coordinate values in the respective images.

Figure 12:
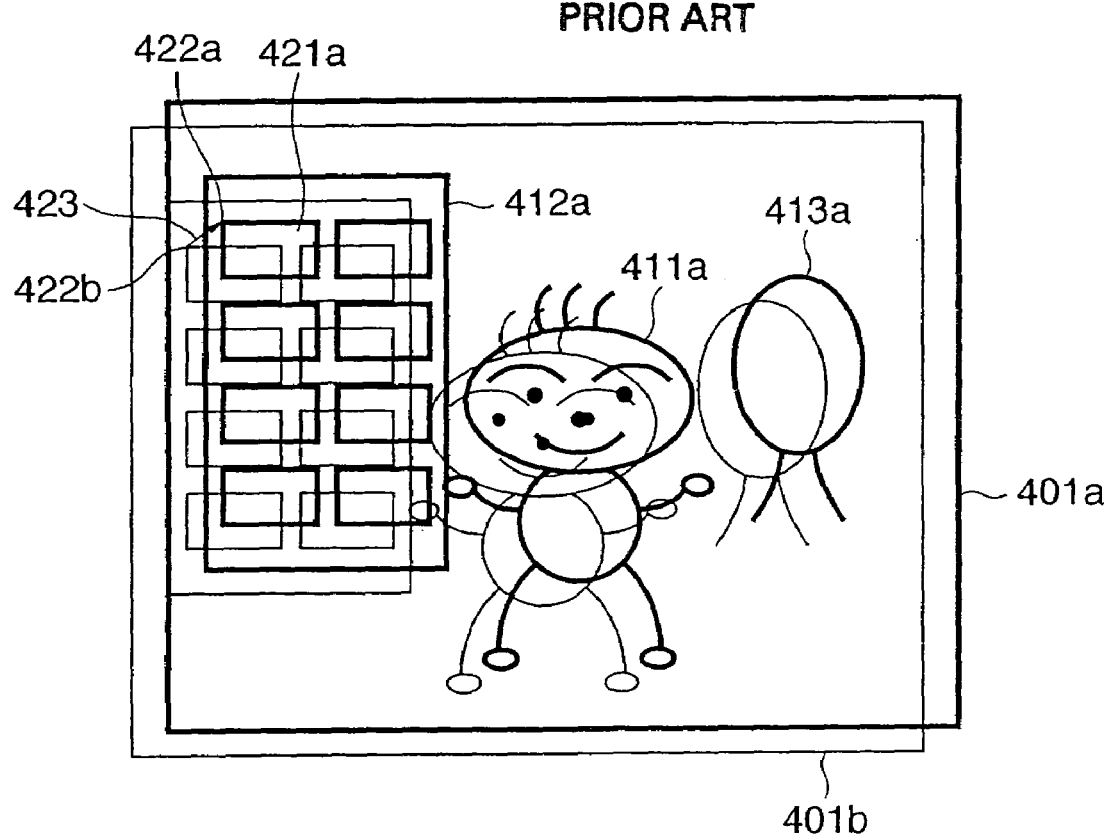
FIG. 12 is a sample explaining the concept of the feature point detection and coordinate conversion.

Note that the feature point extraction, the coordinate position calculation, and the coordinate conversion are the same as those processings performed at steps S114 and S115 in FIG. 12, the detailed explanation thereof will be omitted.

At step S216, it is determined whether or not the coordinate conversion has been completed for all the images stored in the image memory 171. The processing at steps S214 and S215 is repeated until all the images have been processed, and when all the images have been processed, the process proceeds to step S217.

At step S217, all the images, of which the coordinates of the feature point have become the same by coordinate conversion at step S215, are combined by the image combiner 174. The image combining may be performed by, e.g., adding image sensing signal of corresponding coordinates in the respective images. In this manner, as the plurality of images are combined to one image, underexposure state of each image can be improved.

Further, at the same time, in the area of the combined image, an area where all the images are not superposed due to composition shift is cut and a rectangular image is obtained.

Next, at step S218, the image processor 175 performs predetermined image processing such as gamma correction and compression on the image signal of the obtained combined image.

At step S219, the processed combined image data is recorded in the recorder 176 such as a hard disk recorder or a semiconductor memory. Further, at step S220, the image data recorded at step S219 is displayed on the monitor 180 such as a liquid crystal monitor. Note that the order of steps S219 and S220 may be inverted, or these steps may be simultaneously performed.

At step S253, the blur-correction zoom change unit 301 returns the zoom lens 150 to the position before the movement at step S251, and the process ends.

Next, the processing in a case where if it is determined at step S205 that the blur correction operation unit 203 is OFF will be described. If the blur correction is not performed, the zoom lens 150 is not moved, and image sensing is performed with the lens in the same position.

At step S208, the exposure time to be used in image sensing operation is determined from the image sensing conditions such as the brightness of the subject or the like obtained at step S203. The way of obtaining the exposure time is similar to that performed at step S206, however, as the blur correction processing is not performed here, the exposure time is obtained on the premise that image sensing is performed once.

At step S209, when the switch SW2 is turned ON by the user's full stroke of the release operation unit 201, the process proceeds to step S211, while if the full stroke of the release operation unit 201 has not been performed, the process ends.

At step S211, the shutter 153 is released to achieve the exposure time determined at step S208, and an image is obtained. The image is subjected to predetermined signal processing by the camera signal processor 162, then inputted via the signal switching unit 165 into the image processor 175, and the above-described processing such as gamma correction and compression are performed at step S218. As the subsequent operations are the same as those described above, the explanations thereof will be omitted. Note that the image obtained at step S211 may be temporarily stored in an internal memory (not shown) then sent to the image processor 175. Further, the image memory 171 may be employed as this internal memory. Further, as the view angle is not changed, the blur-correction zoom change unit 301 does not change the position of the zoom lens 150 at step S253. Otherwise, in a case where the blur correction operation unit 203 is OFF, the processing at step S253 may be skipped.

Finally, the image view angle obtained by the image combining and area cutting upon blur correction processing according to the first embodiment will be described with reference to FIGS. 3A to 3C.

Figure 2:
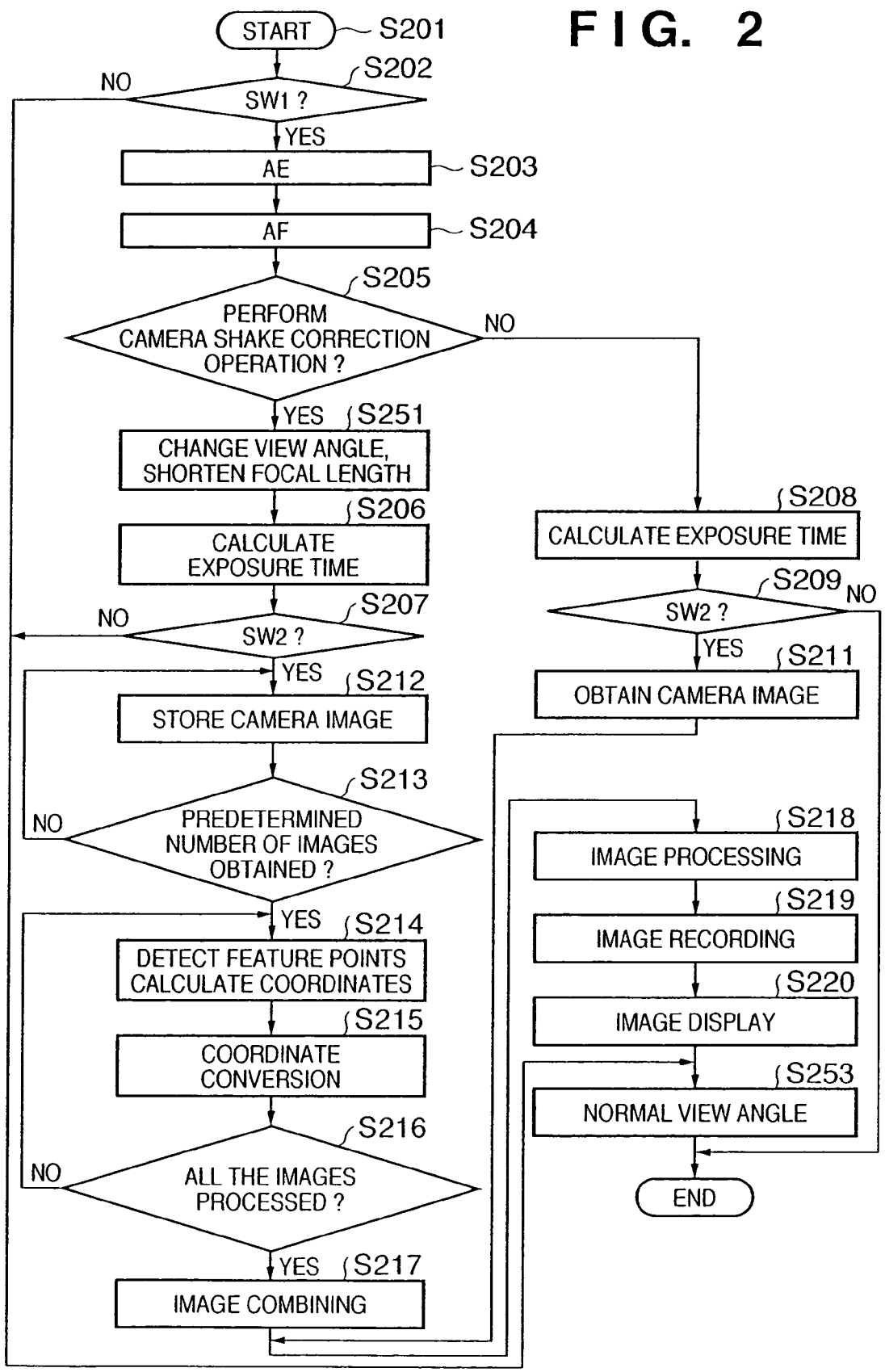
FIG. 2 is a flowchart showing the operation of the image sensing apparatus according to the first embodiment of the present invention.
Figure 3A:
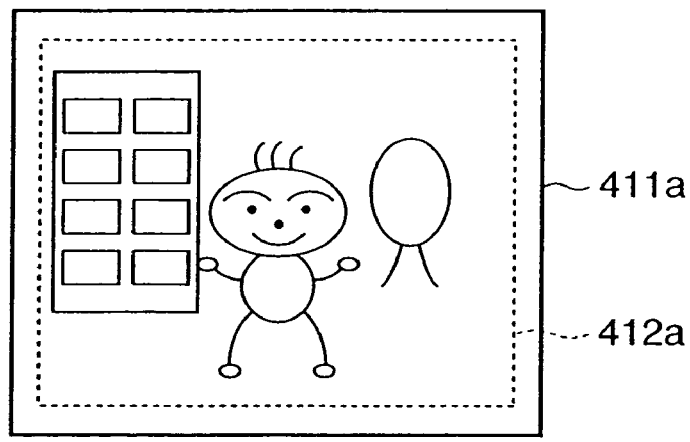
FIGS. 3A to 3C are samples of images for explaining the view angle of an image obtained by image combining and area cutting upon blur correction processing according to the first embodiment of the present invention.
Figure 3B:
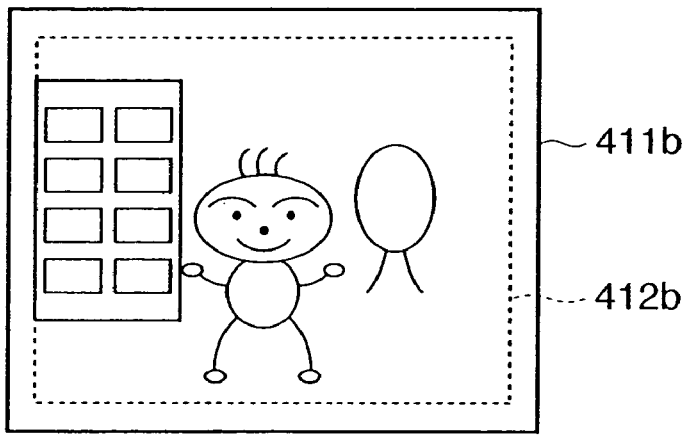
Figure 3C:
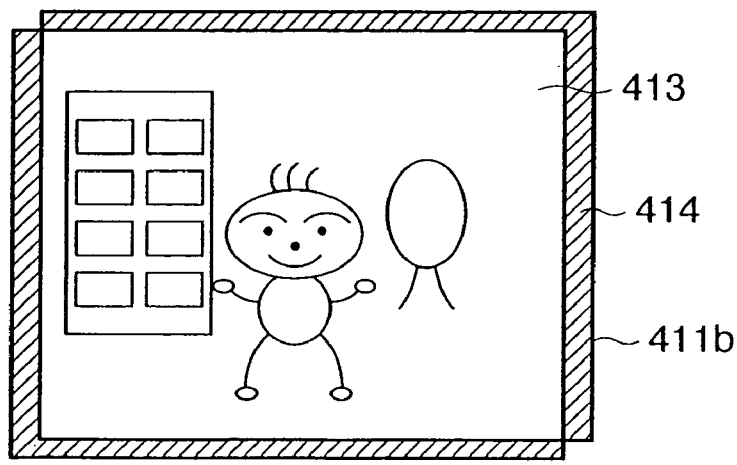
Figure 13A:
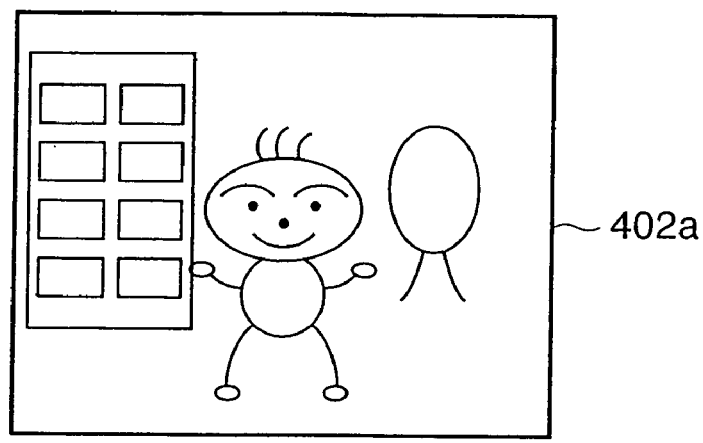
FIGS. 13A to 13C are samples showing the view angle of an image obtained by image combining and area cutting upon the conventional blur correction processing.
Figure 13B:
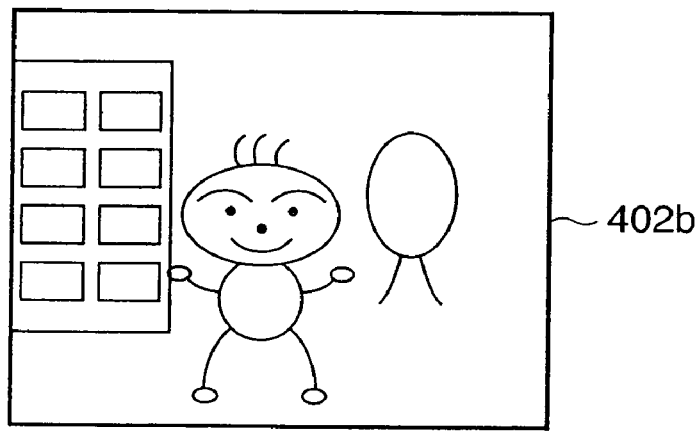
Figure 13C:
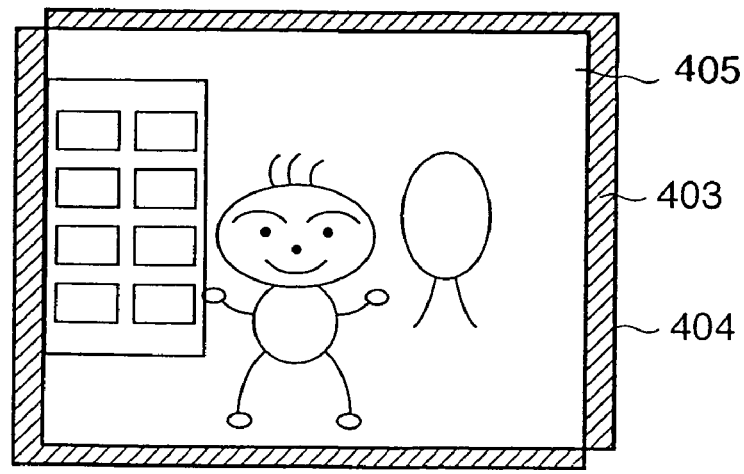

In FIGS. 3A and 3B, two pictures with a composition shift, as images 411a and 411b, are combined. As the view angle is widened by moving the zoom lens 150 by a predetermined amount to the shorter focal length side, the range of image sensing is wider in comparison with the conventional art as shown in FIGS. 13A to 13C. Note that in FIGS. 3A and 3B, dotted line areas 412a and 412b indicate the user's intended view angle, i.e., the view angle before change at step S251 in FIG. 2. An image 413 in FIG. 3C is obtained by superpose-combining while coordinate conversion such that the feature points in the images 411a and 411b match with each other. As it is understood from FIG. 3C, an area 414 where the images are not superposed is generated in the combined image 413, however, as the view angle has been widened before performing image sensing operation, the influence of change in view angle caused by cutting the area 414 can be reduced.

As described above, according to the first embodiment, in a case where blur correction is set with the blur-correction operation unit 203, the view angle is previously widened by controlling the zoom lens 150 to have a shorter focal length, thereby a cutting margin can be made. Accordingly, even in a case where the blur correction accompanied by electrical coordinate conversion is performed, the view angle of an image, obtained by cutting from a combined image an image area where all of images are not superposed, is not smaller than that of an image which has not undergone the blur correction. That is, the user's intended view angle can be ensured.

Note that in FIG. 1, the image sensing controller 300 particularly includes the blur-correction zoom change unit 301, and if the blur correction operation unit 203 is ON when the switch SW1 of the release operation unit 201 is turned ON, the position of the zoom lens 150 is changed. However, the present invention is not limited to this arrangement. For example, it may be arranged such that the image sensing controller 300 realizes a similar operation by software without the blur-correction zoom change unit 301.

Second Embodiment

Next, a second embodiment of the present invention will be described.

In the second embodiment, the change amount of focal length of the zoom lens 150 in image sensing is calculated based on a current focal length. Further, as an example of the present invention, the blur correction processing is always performed without blur correction ON/OFF setting, which is different from the first embodiment.

Figure 4:
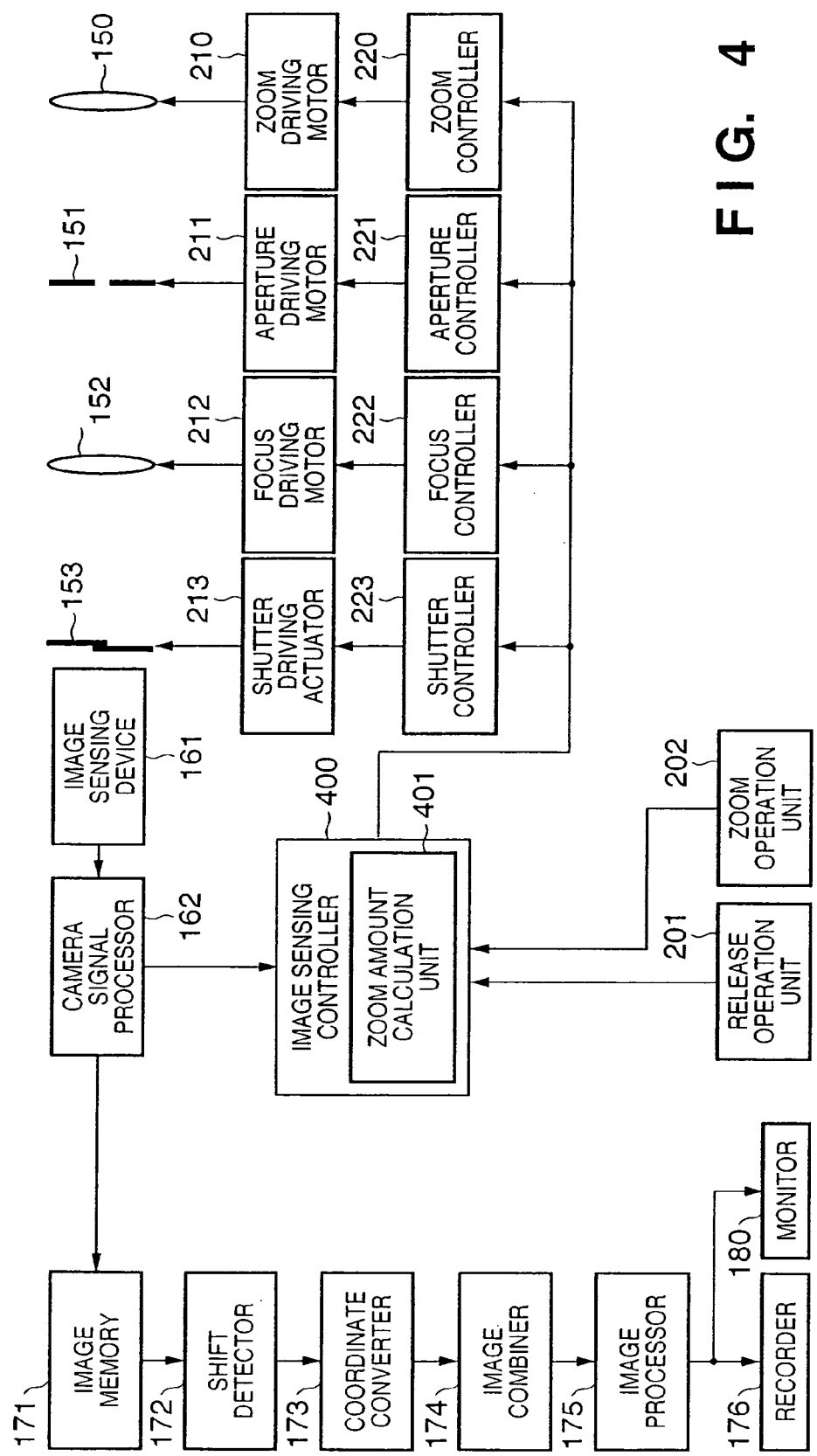
FIG. 4 is a block diagram schematically showing the construction of the image sensing apparatus according to a second embodiment of the present invention.

FIG. 4 is a block diagram schematically showing the construction of the image sensing apparatus according to the second embodiment of the present invention. Note that the construction in FIG. 4 is the same as that in FIG. 10 except that the signal switching unit 165 and the blur correction operation unit 203 are omitted and an image sensing controller 400 has a zoom amount calculation unit 401. Accordingly, the constituent elements are referred by the same reference numerals and the explanations thereof will be omitted.

Further, as the feature point extraction, the coordinate position calculation and the coordinate conversion are the same as those described in the conventional art, the explanations thereof will be omitted.

Figure 5:
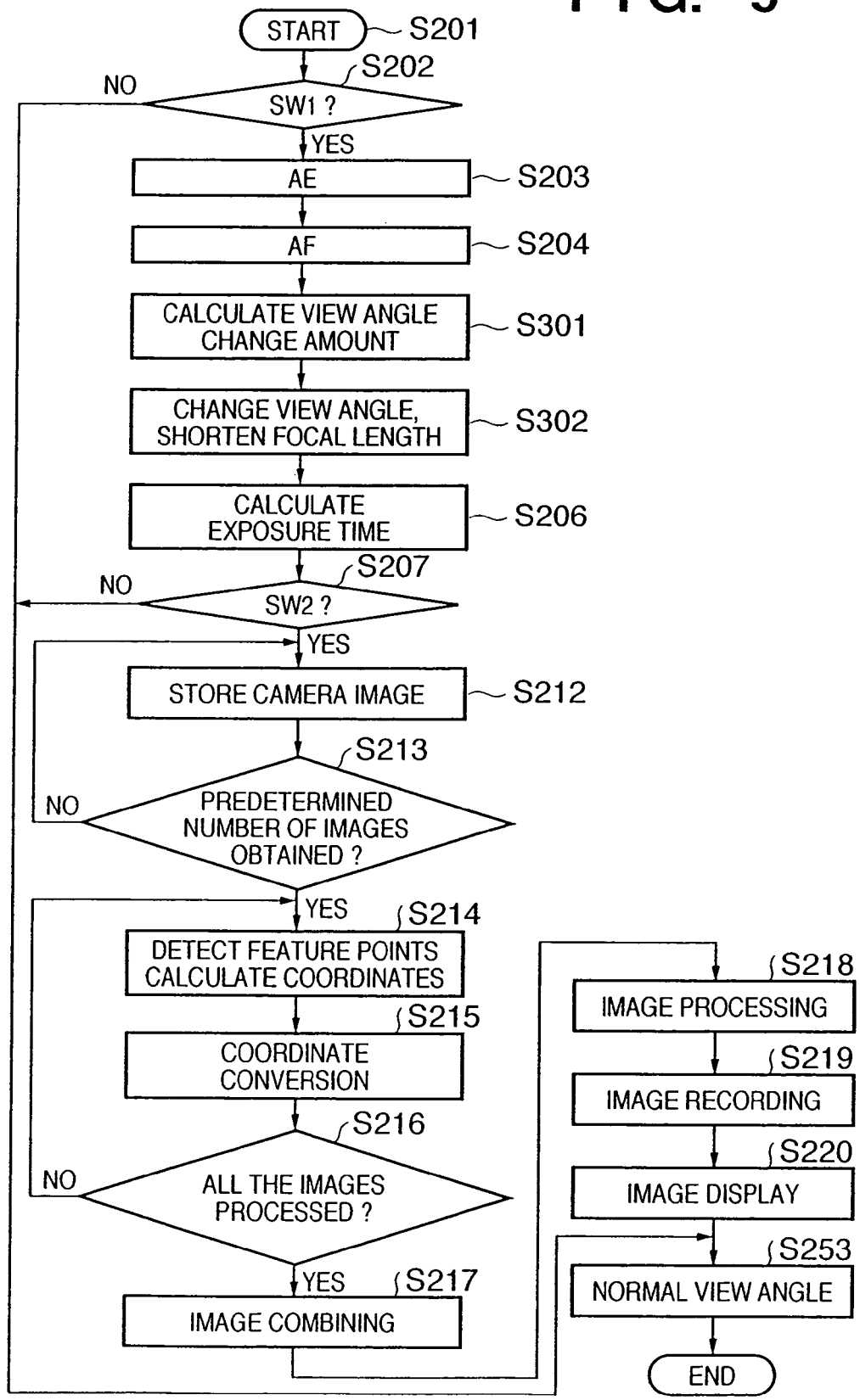
FIG. 5 is a flowchart showing the operation of the image sensing apparatus according to the second embodiment of the present invention.

Next, the operation of the image sensing apparatus according to the second embodiment will be described with reference to the flowchart of FIG. 5.

As steps S201 to S204 are the same as those in FIG. 2 described in the above first embodiment, the explanation thereof will be omitted. Note that in the second embodiment, as the blur correction operation unit 203 is omitted, the determination of ON/OFF of the blur correction at step S205 in FIG. 2 and the processing at step S208 and its subsequent steps in the case where the blur correction is not performed is not performed.

At step S301, the zoom amount calculation unit 401 determines a change amount of focal length of the zoom lens 150 in image sensing based on the currently set position of the zoom lens 150.

Figure 6:
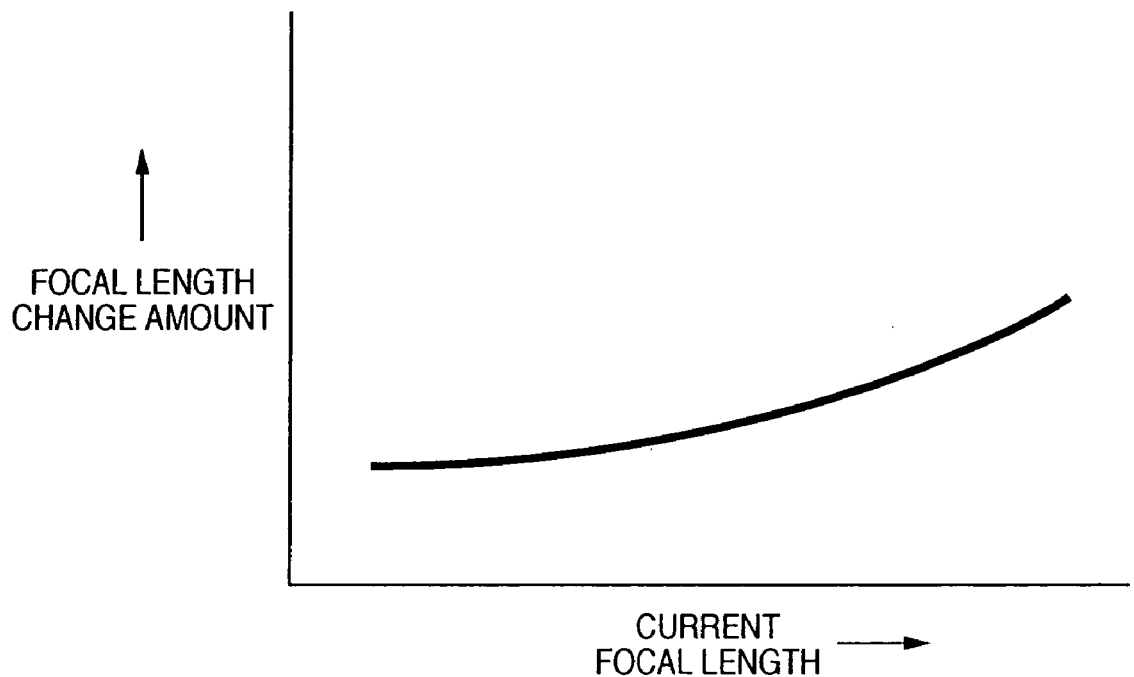
FIG. 6 is a graph showing the focal length change amount according to the second embodiment of the present invention.

As shown in the graph of FIG. 6, as the focal length is increased, the change amount of focal length is increased. When the focal length is increased toward telephoto side and the view angle is narrowed, a subject image is enlarged. Accordingly, under the similar amount of camera shake, the amount of image shift on the image sensing device 161, i.e., the blur amount, is larger when the focal length is long than when the focal length is short. In the above-described image area of the superpose-combined image, the area where all the images are not superposed due to composition shift increases.

At step S302, the position of the zoom lens 150 is moved by the change amount obtained at step S301. More particularly, the image sensing controller 400 generates a zoom control signal based on the change amount obtained at step S301, and sends the signal to the zoom controller 220. The zoom controller 220 moves the zoom lens 150 via the zoom driving motor 210 based on the zoom control signal.

As the processing at step S260 and its subsequent steps is the same as that at corresponding steps in FIG. 2, the explanation thereof will be omitted.

As described above, according to the second embodiment, the focal length of the zoom lens 150 is changed in correspondence with the focal length of the zoom lens 150 set by the user so as to widen the view angle before image sensing operation. Accordingly, a more appropriate cutting margin can be obtained in correspondence with the focal length. Thus, the user's intended view angle can be ensured after the blur correction.

Note that the zoom amount calculation unit 401 may determine the change amount by an arithmetic operation corresponding to the graph of FIG. 6 based on the focal length of the zoom lens 150 set by the user. Otherwise, the contents shown in the graph of FIG. 6 may be stored in a memory (not shown) in the form of look-up table, and a corresponding change amount may be read from the look-up table in correspondence with the focal length. Further, the image sensing controller 400 may perform a similar operation to that of the zoom amount calculation unit 401 by software, without particularly providing the zoom amount calculation unit 401.

Third Embodiment

Next, a third embodiment of the present invention will be described.

In the third embodiment, the change amount of focal length of the zoom lens 150 is calculated based on the number of images and the respective exposure periods required in image sensing, calculated by the processing by the image sensing controller 400, i.e., the total time required in image sensing. Further, as in the case of the above-described second embodiment, the blur correction is always performed without blur correction ON/OFF setting.

As the image sensing according to the third embodiment has the same construction as that shown in the block diagram of FIG. 4 described in the second embodiment, the explanation thereof will be omitted.

Further, as the feature point extraction, the coordinate position calculation and the coordinate conversion are the same as those described in the conventional art, the explanations thereof will be omitted.

Next, the operation of the image sensing apparatus according to the third embodiment will be described with reference to the flowchart of FIG. 14 described in the second embodiment. In FIG. 14, the processes which are similar to those shown in FIG. 5 are referred to by the same reference numerals.

As steps S201 to S204 and S206 are the same as those in FIG. 2 described in the above first embodiment, the explanations thereof will be omitted. Note that in the third embodiment, as in the case of the second embodiment, as the blur correction operation unit 203 is omitted, the determination of ON/OFF of the blur correction at step S205 in FIG. 2 and the processing at step S208 and its subsequent steps in the case where the blur correction is not performed is not performed.

At step S301, the zoom amount calculation unit 401 determines a change amount of focal length of the zoom lens 150 in image sensing based on the number of images and each exposure time obtained by the image sensing controller 400 at step S206. More particularly, the periods required for exposure in the respective image sensings are added up as total image sensing time, and the focal length of the zoom lens 150 in image sensing is changed in correspondence with the total image sensing time.

Figure 7:
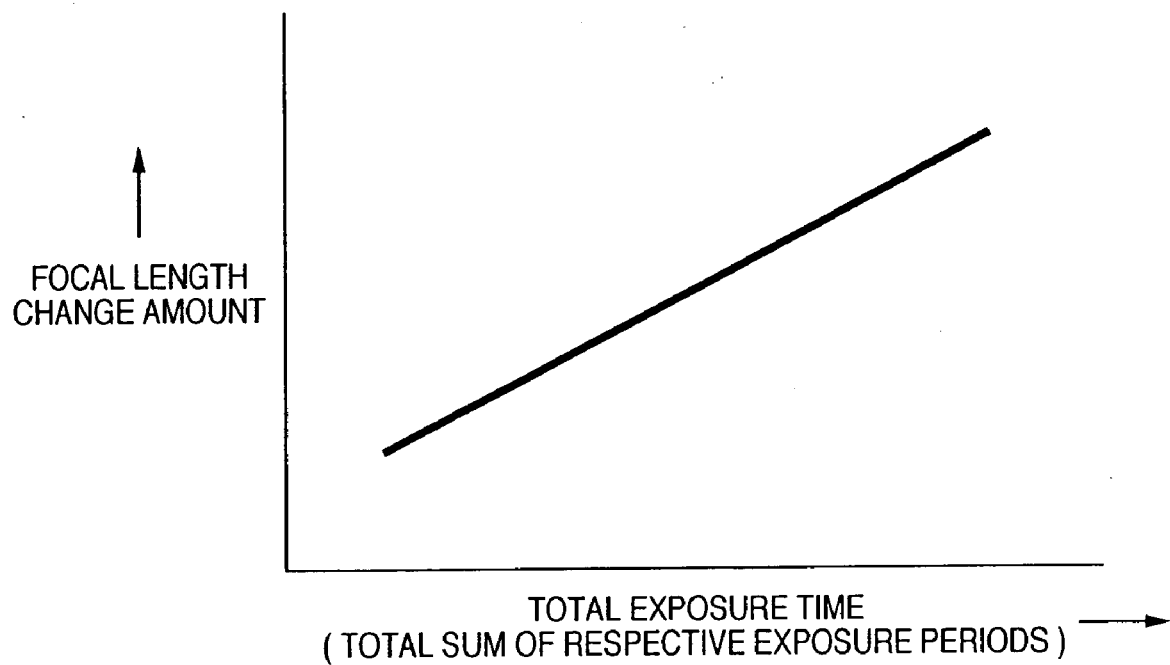
FIG. 7 is a graph showing the focal length change amount according to a third embodiment of the present invention.

As shown in the graph of FIG. 7, the change amount of the focal length of the zoom lens 150 is increased as the total image sensing time is increased.

This is because, under the similar amount of camera shake, the composition shift is increased as the total image sensing time is increased. In the above-described image area of the superpose-combined image, the area where all the images are not superposed due to composition shift increases.

At the next step S302, the position of the zoom lens 150 is moved by the change amount obtained at step S301. More particularly, the image sensing controller 400 generates a zoom control signal based on the change amount obtained at step S301, and sends the signal to the zoom controller 220. The zoom controller 220 moves the zoom lens 150 via the zoom driving motor 210 based on the zoom control signal.

As the processing at step S260 and its subsequent steps is the same as that at corresponding steps in FIG. 2, the explanation thereof will be omitted.

As described above, according to the third embodiment, the focal length of the zoom lens 150 is changed in correspondence with the number of images and the respective exposure periods obtained in the exposure control processing by the image controller 400 so as to widen the view angle before image sensing operation. Accordingly, a more appropriate cutting margin can be obtained in correspondence with-the total image sensing time. Thus, the user's intended view angle can be ensured after the blur correction.

Note that the zoom amount calculation unit 401 may determine the change amount by an arithmetic operation corresponding to the graph of FIG. 7 based on the number of images and the respective exposure periods obtained by the exposure control processing by the image controller 400. Otherwise, the contents shown in the graph of FIG. 7 may be stored in a memory (not shown) in the form of look-up table, and a corresponding change amount may be read from the look-up table in correspondence with the total exposure time. Further, the image sensing controller 400 may perform a similar operation to that of the zoom amount calculation unit 401 by software, without particularly providing the zoom amount calculation unit 401.

Fourth Embodiment

Next, a fourth embodiment of the present invention will be described.

In the fourth embodiment, the change amount of focal length in image sensing is calculated based on camera shake.

Figure 8:
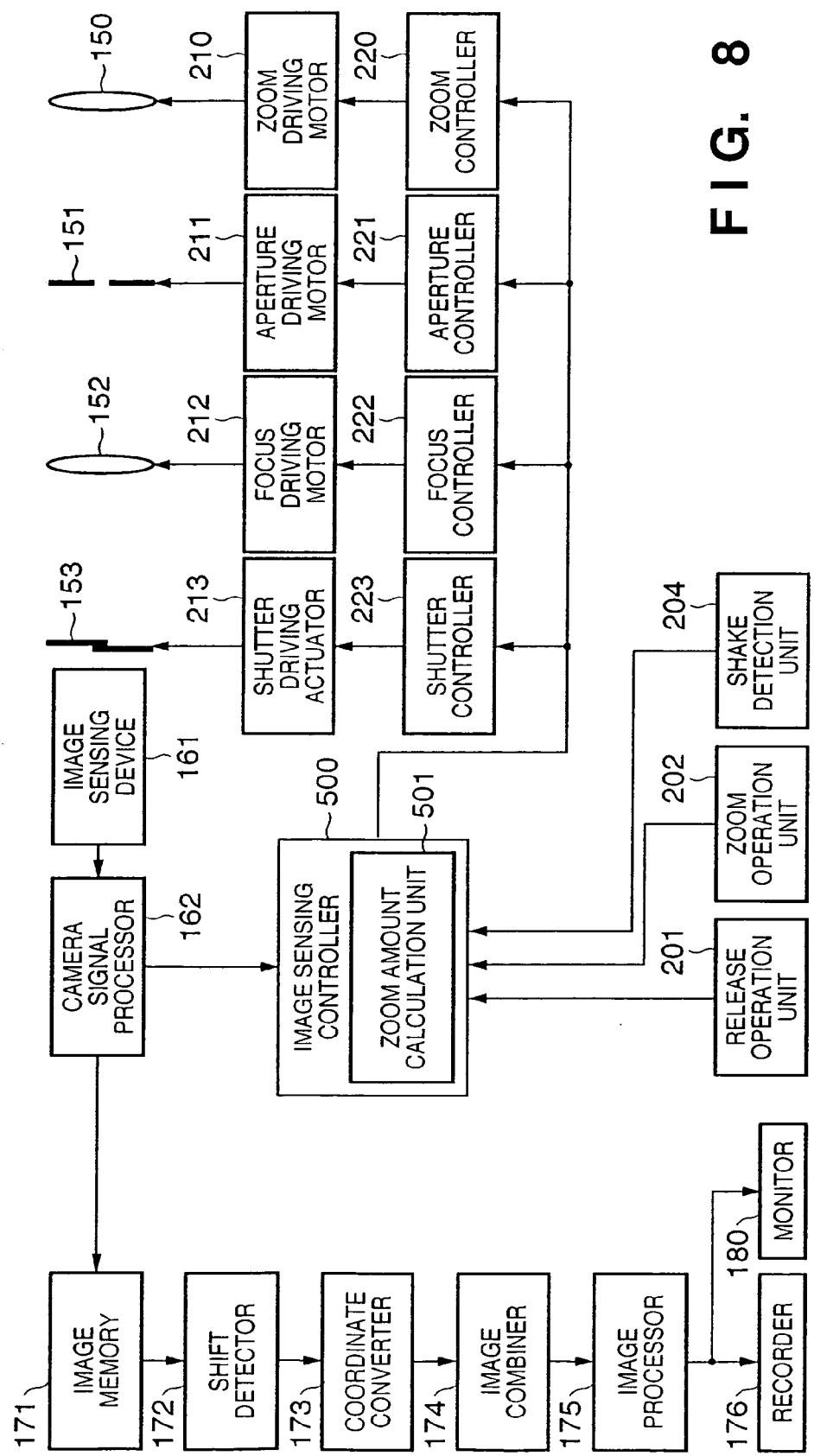
FIG. 8 is a block diagram schematically showing the construction of the image sensing apparatus according to a fourth embodiment of the present invention.

FIG. 8 is a block diagram schematically showing the construction of the image sensing apparatus according to the fourth embodiment of the present invention. Note that in the construction of FIG. 8, the explanations of constituents having the same reference numerals of those in FIG. 10 will be omitted. The difference from FIG. 10 is that the signal switching unit 165 and the blur correction operation unit 203 are omitted, a shake detection unit 204 is provided, and an image sensing controller 500 includes a zoom amount calculation unit 501.

The image sensing controller 500, comprising e.g. a microcomputer, performs automatic focus (AF) control, automatic exposure (AE) control, zoom lens control, shutter control and the like, and inputs operation signals from the release operation unit 201 and the zoom operation unit 202, and further, inputs a shake amount of the image sensing apparatus from the shake detection unit 204.

The shake detection unit 204 is, e.g., an angular velocity sensor or an acceleration sensor.

Further, as the feature point extraction, the coordinate position calculation and the coordinate conversion are the same as those described in the conventional art, the explanations thereof will be omitted.

Next, the operation of the image sensing apparatus according to the fourth embodiment will be described. As the operation is basically approximately the same as that of the second embodiment, the operation will be described with reference to FIG. 5. The difference from the second embodiment is the calculation of zoom change amount at step S301. As the other processings are the same as those in the second embodiment, the explanations thereof will be omitted.

At step S301, the change amount of focal length of the zoom lens 105 is determined in correspondence with the shake amount of the image sensing apparatus obtained by the shake detection unit 204.

Figure 9:
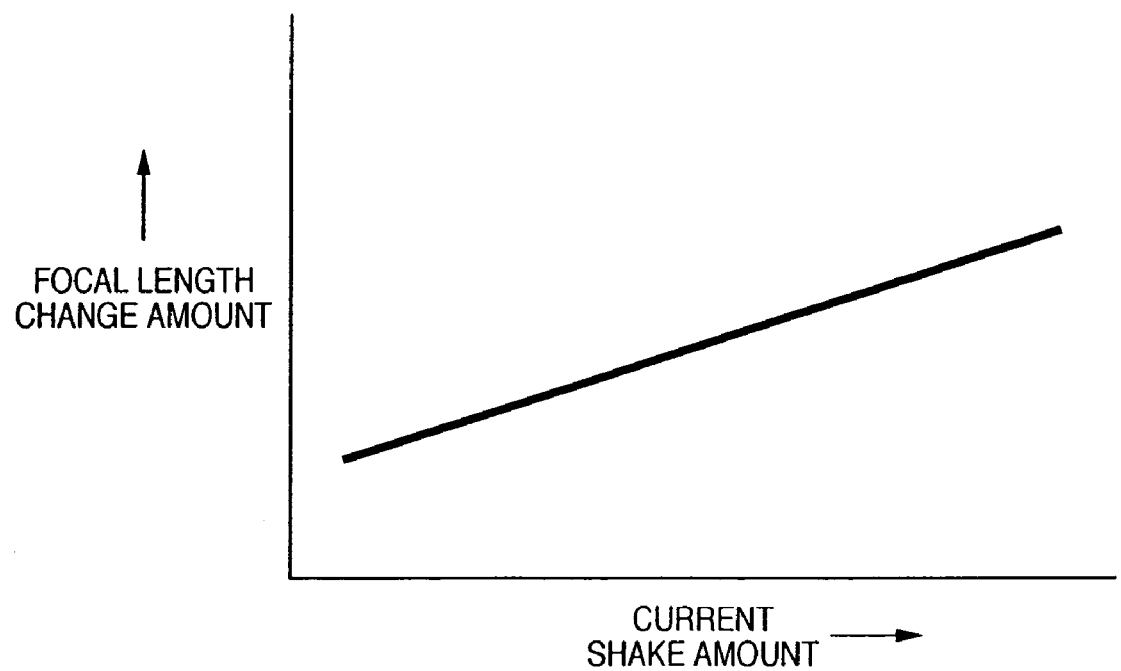
FIG. 9 is a graph showing the focal length change amount according to the fourth embodiment of the present invention.

As shown in FIG. 9, as the shake amount is increased, the change amount of focal length is increased. When the shake amount is increased, as the moving amount of image on the image sensing device 161, i.e., the blur amount, is increased. In the above-described image area of the superpose-combined image, the area where all the images are not superposed due to composition shift increases.

At the next step S302, the position of the zoom lens 150 is moved by the change amount obtained at step S301.

As described above, according to the fourth embodiment, the focal length of the zoom lens 150 is changed in correspondence with the shake amount of the image sensing apparatus so as to widen the view angle before image sensing. Accordingly, a more appropriate cutting margin can be obtained in correspondence with the shake amount. Thus, the user's intended view angle can be ensured after the blur correction.

Note that the zoom amount calculation unit 501 may determined the change amount by an arithmetic operation corresponding to the graph of FIG. 9 based on the shake amount detected by the shake detection unit 204. Otherwise, the contents shown in the graph of FIG. 9 may be stored in a memory (not shown) in the form of look-up table, and a corresponding change amount may be read from the look-up table in correspondence with the shake amount. Further, the image sensing controller 500 may perform a similar operation to that of the zoom amount calculation unit 501 by software, without particularly providing the zoom amount calculation unit 501.

Other Embodiment

Note that in the above-described second to fourth embodiments, the blur correction operation unit 203 is omitted, however, this arrangement does not pose any limitation on the present invention. It may be arranged such that the blur correction operation unit 203 is provided, and the processings at step S205 and steps S208 to S211 in the flowchart of FIG. 2 are added to the processings shown in the flowchart of FIG. 5 or 14. Otherwise, in the first embodiment, the blur correction may be always performed without providing the blur correction operation unit 203.

Further, in the above-described first to fourth embodiments, plural images are obtained by image sensing and these images are combined with regard to blur correction processing, however, the purpose of the combining of plural images is not limited to the blur correction. For example, the image combining may be performed for other various purposes such as dynamic range expansion.

Note that the present invention can be applied to an apparatus comprising a single device (e.g., digital still camera, digital video camera) or to system constituted by a plurality of devices (e.g., host computer, interface, camera head).

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 0.2003-307185 filed on Aug. 29, 2003, the entire contents of which are hereby incorporated herein by reference.

What is claimed is:

1. An image sensing apparatus which performs a plurality of times of image sensing on a subject, superpose-combines a plurality of subject images obtained by the image sensing into one subject image, comprising:
   an image sensing unit that converts a subject optical image into an electric signal;
   an optical unit that changes a view angle; and
   a change unit that changes a position of said optical unit so as to widen the view angle by a predetermined amount, prior to said plurality of times of image sensing on the subject,
   wherein the image sensing apparatus is operative in a mode to perform image sensing on the subject once and obtain one subject image, and if a mode to perform a plurality of times of image sensing on the subject then superpose-combine a plurality of subject images obtained by the image sensing into one subject image is set, said change unit changes the position of said optical unit so as to widen the view angle by the predetermined amount, prior to said plurality of times of image sensing on the subject.

2. The image sensing apparatus according to claim 1, wherein said predetermined amount is a predetermined fixed value.

3. The image sensing apparatus according to claim 1, wherein said change unit determines said predetermined amount based on the view angle before the changing of said optical unit.

4. The image sensing apparatus according to claim 3, wherein said predetermined amount is increased as the view angle before the changing of said optical unit is narrow.

5. The image sensing apparatus according to claim 1, wherein said change unit determines said predetermined amount based on a total exposure time in said plurality of times of image sensing.

6. The image sensing apparatus according to claim 5, wherein said predetermined amount is increased as the total exposure time is long.

7. The image sensing apparatus according to claim 1, further comprising a shake detection unit that detects a shake amount of said image sensing apparatus,
   wherein said change unit determines said predetermined amount based on the shake amount detected by said shake detection unit.

8. The image sensing apparatus according to claim 7, wherein said predetermined amount is increased as the shake amount is large.

9. The image sensing apparatus according to claim 1, further comprising:
   a shift amount detection unit that detects a shift amount among said plurality of subject images;
   a coordinate conversion unit that converts coordinates of said plurality of subject images based on the detected shift amount so as to cancel out a shift among the subject images;
   a combining unit that superposes the converted plurality of subject images into one subject image; and
   a cutting unit that cuts an image, out of an area of the subject image combined by said combining unit, where all the plurality of subject images are superposed.

10. The image sensing apparatus according to claim 1, further comprising a determination unit that determines exposure time for one image sensing and the number of times of image sensing to be performed by said image sensing unit based on image sensing conditions, so that exposure of a necessary exposure time is performed by performing said plurality of times of image sensing with said determined exposure time.

11. The image sensing apparatus according to claim 1, wherein when said plurality of subject images have been obtained, said change unit returns said optical unit to a position before the changing.

12. An image sensing method comprising:
    widening a view angle by a predetermined amount;
    performing a plurality of times the image sensing on a subject by an image sensing unit that converts a subject optical image into an electric signal; and
    superpose-combining obtained plurality of subject images into one subject image.

13. The image sensing method according to claim 12, wherein the image sensing unit is operative in plural modes, and if a predetermined mode is set, said widening of the view angle, said plurality of times of image sensing and said superpose-combining are performed.

14. The image sensing method according to claim 12, wherein said predetermined amount is a predetermined fixed value.

15. The image sensing method according to claim 12, further comprising determining said predetermined amount based on the view angle before said widening.

16. The image sensing method according to claim 15, wherein said predetermined amount is increased as the view angle before said widening is narrow.

17. The image sensing method according to claim 12, further comprising determining said predetermined amount based on a total exposure time in said plurality of times of image sensing.

18. The image sensing method according to claim 17, wherein said predetermined amount is increased as the total exposure time is long.

19. The image sensing method according to claim 12, further comprising:
    detecting a shake amount of an image sensing apparatus; and
    determining said predetermined amount based on the detected shake amount.

20. The image sensing method according to claim 19, wherein said predetermined amount is increased as the shake amount is large.

21. The image sensing method according to claim 12, further comprising:
    detecting a shift amount among said plurality of subject images;
    converting coordinates of said plurality of subject images based on the detected shift amount so as to cancel out a shift among the subject images; and
    cutting an image, out of an area of the combined subject image, where all the plurality of subject images are superposed,
    wherein in said superpose-combining, said plurality of coordinate-converted subject images are superpose-combined.

22. The image sensing method according to claim 12, further comprising determining exposure time for one image sensing and the number of times of image sensing to be performed based on image sensing conditions, so that exposure of a necessary exposure time is performed by performing said plurality of times of image sensing with said predetermined exposure time.

23. The image sensing method according to claim 12, further comprising restoring the view angle to that before the widening after said plurality of times of image sensing.

24. A storage medium readable by a data processing apparatus, said storage storing a program which is executable by the data processing apparatus and comprises program code realizing the image sensing method comprising the steps of:
    widening a view angle by a predetermined amount;
    performing a plurality of times the image sensing on a subject by an image sensing unit that converts a subject optical image into an electric signal; and
    superpose-combining obtained plurality of subject images into one subject image.

* * * * *

UNITED STATES PATENT AND TRADEMARK OFFICE
CERTIFICATE OF CORRECTION

PATENT NO. : 7,095,001 B2  Page 1 of 1
APPLICATION NO. : 10/925998
DATED : August 22, 2006
INVENTOR(S) : Kawahara It is certified that error appears in the above-identified patent and that said Letters Patent is hereby corrected as shown below:

ON THE TITLE PAGE, AT ITEM (56), REFERENCES CITED:
U.S. Patent Documents, "6,882,754 B1" should read --6,882,754 B2--.

COLUMN 1:
Line 25, "apparatus, shake" should read --apparatus shake--.

COLUMN 3:
Line 21, "e.g." should read --e.g.,--.
Line 24, "e.g." should read --e.g.,--.
Line 26, "e.g." should read --e.g.,--.

COLUMN 7:
Line 32, "these" should read --this--.

COLUMN 10:
Line 47, "time" should read --times--.

COLUMN 14:
Line 55, "in." should read --in--.

COLUMN 15:
Line 59, "e.g." should read --e.g.,--.

Signed and Sealed this

Twenty-seventh Day of May, 2008

JON W. DUDAS
*Director of the United States Patent and Trademark Office*